(12) United States Patent
Nelson et al.

(10) Patent No.: US 10,941,558 B2
(45) Date of Patent: *Mar. 9, 2021

(54) DWELLING ASSEMBLY

(71) Applicant: SUKUP MANUFACTURING CO., Sheffield, IA (US)

(72) Inventors: Brett A. Nelson, Hampton, IA (US); Eugene G. Sukup, Hampton, IA (US); Steven E. Sukup, Clear Lake, IA (US); Bradley A. Poppen, Sheffield, IA (US); Charles E. Sukup, Dougherty, IA (US)

(73) Assignee: SUKUP MANUFACTURING CO., Sheffield, IA (US)

( * ) Notice: Subject to any disclaimer, the term of this patent is extended or adjusted under 35 U.S.C. 154(b) by 28 days.

This patent is subject to a terminal disclaimer.

(21) Appl. No.: 16/220,053

(22) Filed: Dec. 14, 2018

(65) Prior Publication Data

US 2019/0119898 A1 Apr. 25, 2019

Related U.S. Application Data

(60) Continuation of application No. 14/055,524, filed on Oct. 16, 2013, now Pat. No. 10,301,811, which is a
(Continued)

(51) Int. Cl.
| | | |
|---|---|---|
| *E04H 1/12* | (2006.01) |
| *E04B 1/00* | (2006.01) |
| *E04B 7/02* | (2006.01) |
| *E04D 13/17* | (2006.01) |
| *E04H 9/16* | (2006.01) |
| *E06B 1/04* | (2006.01) |
| *E04B 2/84* | (2006.01) |
| *E03B 3/02* | (2006.01) |

(52) U.S. Cl.
CPC ............... *E04B 1/00* (2013.01); *E04B 7/028* (2013.01); *E04D 13/17* (2013.01); *E04H 1/1205* (2013.01); *E04H 9/16* (2013.01); *E06B 1/04* (2013.01); *E03B 3/02* (2013.01); *E04B 2/84* (2013.01); *E04B 2001/0061* (2013.01); *Y02B 10/20* (2013.01)

(58) Field of Classification Search
CPC ......... E02D 27/30; E02D 27/50; E02D 17/04; E04H 7/22; E04H 7/30; E04H 19/14; E04H 15/62; E04H 9/14
See application file for complete search history.

(56) References Cited

U.S. PATENT DOCUMENTS 3,331,524 A * 7/1967 Wiley, Jr. ............... A47H 27/00
220/4.28
3,333,595 A * 8/1967 Bannister ................ E04H 15/28
135/98
(Continued)

*Primary Examiner* — Jessica L Laux
(74) *Attorney, Agent, or Firm* — Zarley Law Firm, P.L.C.

(57) ABSTRACT

A dwelling assembly that has a continuous sidewall and an opening for a door and a window. A roof assembly is provided with first and second roofs that are spaced apart such that the outer roof acts as a heat shield for the inner roof to ensure the interior of the dwelling is a minimum temperature. In addition, ballast boxes are utilized in order to provide additional weight to the dwelling and a planting area in association with the dwelling assembly.

10 Claims, 5 Drawing Sheets

Related U.S. Application Data division of application No. 13/315,543, filed on Dec. 9, 2011, now Pat. No. 8,646,221.

(60) Provisional application No. 61/491,003, filed on May 27, 2011.

(56) References Cited

U.S. PATENT DOCUMENTS

| | | | | |
|---|---|---|---|---|
| 3,800,470 A | * | 4/1974 | Kleine | A47H 27/00 47/68 |
| 3,835,602 A | * | 9/1974 | Tuuri | E04B 1/34321 52/82 |
| 4,048,754 A | * | 9/1977 | Laux | A01G 9/02 47/68 |
| 4,407,319 A | * | 10/1983 | Shultz | E04H 15/003 135/87 |
| 5,184,436 A | * | 2/1993 | Sadler | E04B 1/34321 446/478 |
| 5,901,508 A | * | 5/1999 | Menzel | E04B 1/34869 4/584 |
| 8,166,714 B2 | * | 5/2012 | Ziegelman | E04B 1/3483 52/220.2 |

* cited by examiner

DWELLING ASSEMBLY

CROSS REFERENCE TO RELATED APPLICATION

This application is a continuation of U.S. application Ser. No. 14/055,524 filed Oct. 16, 2013, which is a divisional of U.S. application Ser. No. 13/315,543 filed Dec. 9, 2011 and issued as U.S. Pat. No. 8,646,221 on Feb. 11, 2014, which claims the benefit of priority of U.S. Provisional Application No. 61/491,003 filed May 27, 2011, the contents of these applications are hereby incorporated by reference in their entirety.

BACKGROUND OF THE INVENTION

This invention relates to dwellings. More specifically, this invention relates to dwelling assemblies to be used as inexpensive housing.

Natural disasters throughout the world such as in Haiti have left millions without shelter. Shelter is an essential need for individuals especially in areas such as Haiti where extreme temperatures, wind, rain, and the like occur causing additional hardships on individuals who are already suffering as a result of natural disasters. After a disaster often emergency housing is needed such as tents. Prior to the development of permanent housing transitional dwellings are used.

Transitional dwellings have been made for many years and typically provide an outer wall and transitional roof to provide shelter from the elements. While current transitional housing may be erected by individuals, these dwellings provide minimal protection in heated climate areas and additionally in areas with more severe weather. In addition, these dwellings are not fire resistant, insect resistant, nor do they assist in providing a clean water supply. Thus, a need in the art exists for a dwelling that is easy to erect, has increased strength and stability to protect against high winds and avoid destruction from additional weather and simultaneously protects individuals against the effects of the sun and hot climate areas, is reusable, and eliminates the need for separate emergency, transitional, and permanent housing by providing an inexpensive dwelling.

Thus, a principle object of the present invention is to provide a dwelling that minimizes the heat in the interior of the dwelling.

Another object of the present invention is to provide a dwelling that is easy to erect, disassemble, transport, and reuse.

Yet another object of the present invention is to provide a dwelling that provides improved strength and stability against the elements and security from theft.

These and other objects, features, and advantages will become apparent from the specification and claims.

BRIEF SUMMARY OF THE INVENTION

A dwelling assembly that includes a sidewall that has an opening for a door. A roof assembly has a first roof that is engaged and secured to the sidewall and extends from the sidewall upwardly toward a central opening. The roof assembly additionally has a second roof secured to the first roof in spaced relation by a plurality of rib elements such that second roof absorbs heat from the sun and acts as a heat shield to prevent sunlight from reaching the first roof.

DETAILED DESCRIPTION OF THE PREFERRED EMBODIMENT

Figure 1:
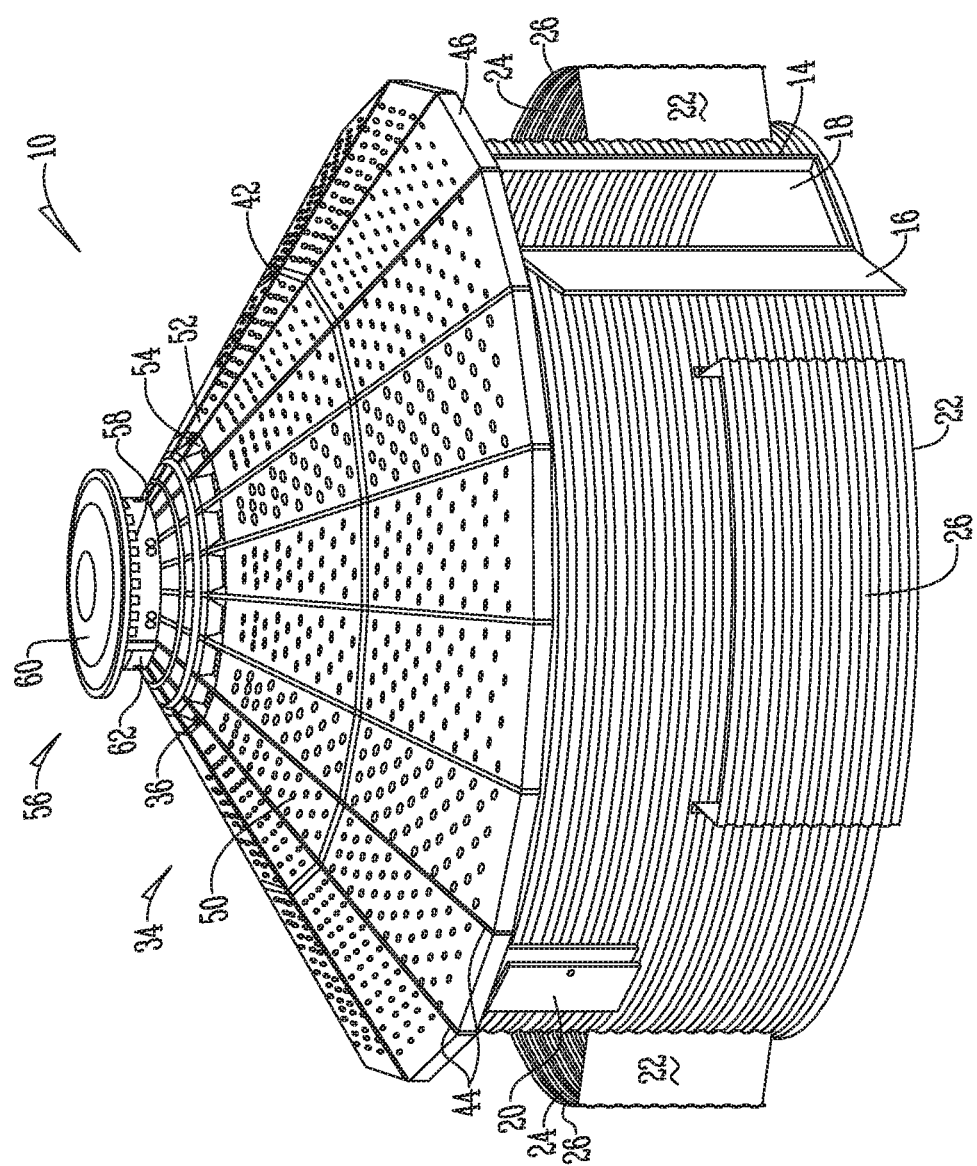
FIG. 1 is a front perspective view of a dwelling assembly.

FIG. 1 shows a dwelling assembly 10 that has a continuous sidewall 12 that is generally arcuate and rounded in shape. In a preferred embodiment the sidewall is made from corrugated steel to provide additional structural integrity to the dwelling. Disposed within the sidewall 12 is at least one door opening 14 for hingedly receiving a door 16 for accessing the interior 18 of the dwelling assembly 10. In a preferred embodiment the door contains a lock to provide security for the dwelling assembly 10. Also disposed through the sidewall 12 is at least one window 20 that like the door 16, can have a lock such that the window 20 provides additional access to the exterior for additional ventilation, sunlight and vision.

Figure 2:
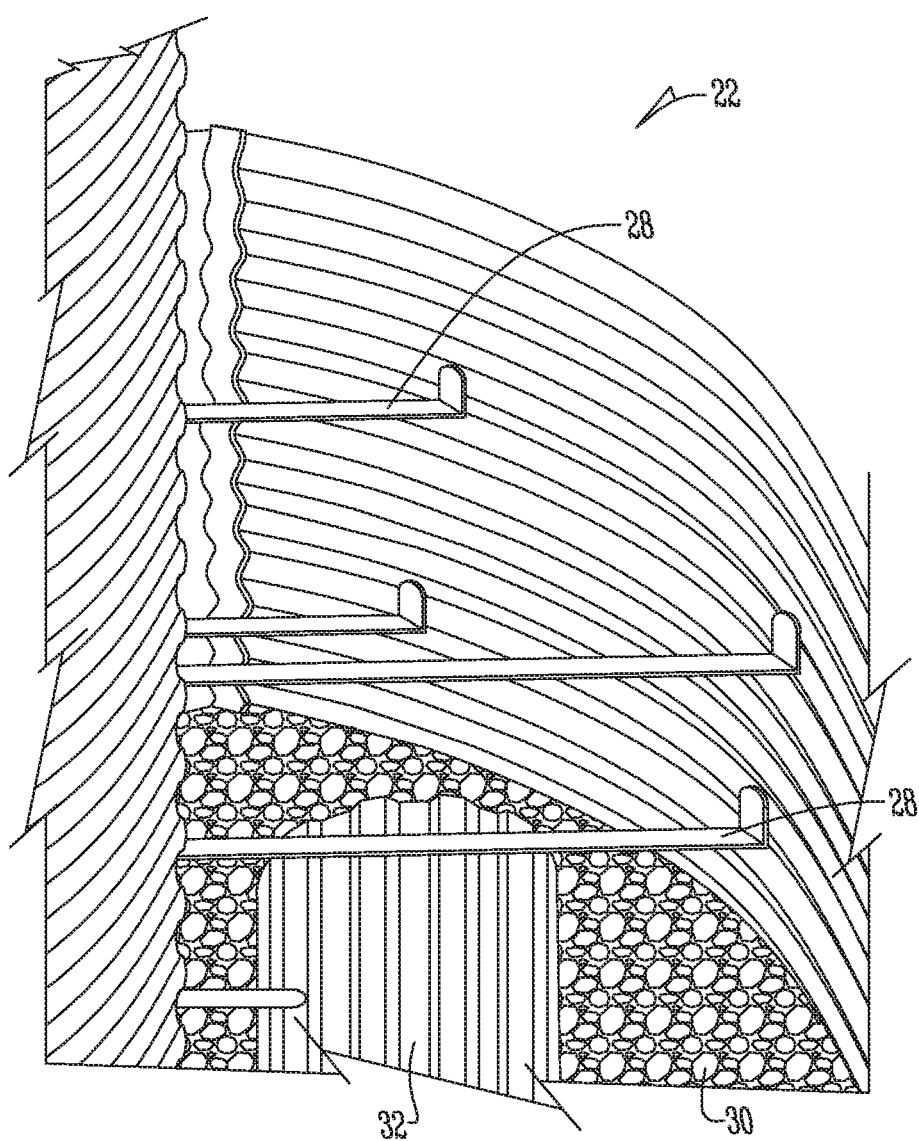
FIG. 2 is a top perspective view of a ballast box of a dwelling assembly.

As best shown in FIG. 2 a plurality of ballast boxes 22 surround and are secured to the sidewall 12. Each ballast box 22 has a hollow interior 24 surrounded by a corrugated sidewall 26 that is arcuate in shape. Connection members 28 secure the ballast boxes 22 to the sidewall 12 of the dwelling assembly 10. Each ballast box 22 has at least one plate element 32 that partially covers the bottom of the ballast box 22 and engages the ground 30. Thus, materials such as rock or sand can be placed in the ballast box 22 that provide weight for the dwelling assembly 10 to be held to the ground 30 to withstand high winds and the like. In a preferred embodiment soil is placed on the top of the rock or sand such that plants for food may be planted within the ballast boxes for additional functionality.

Figure 3:
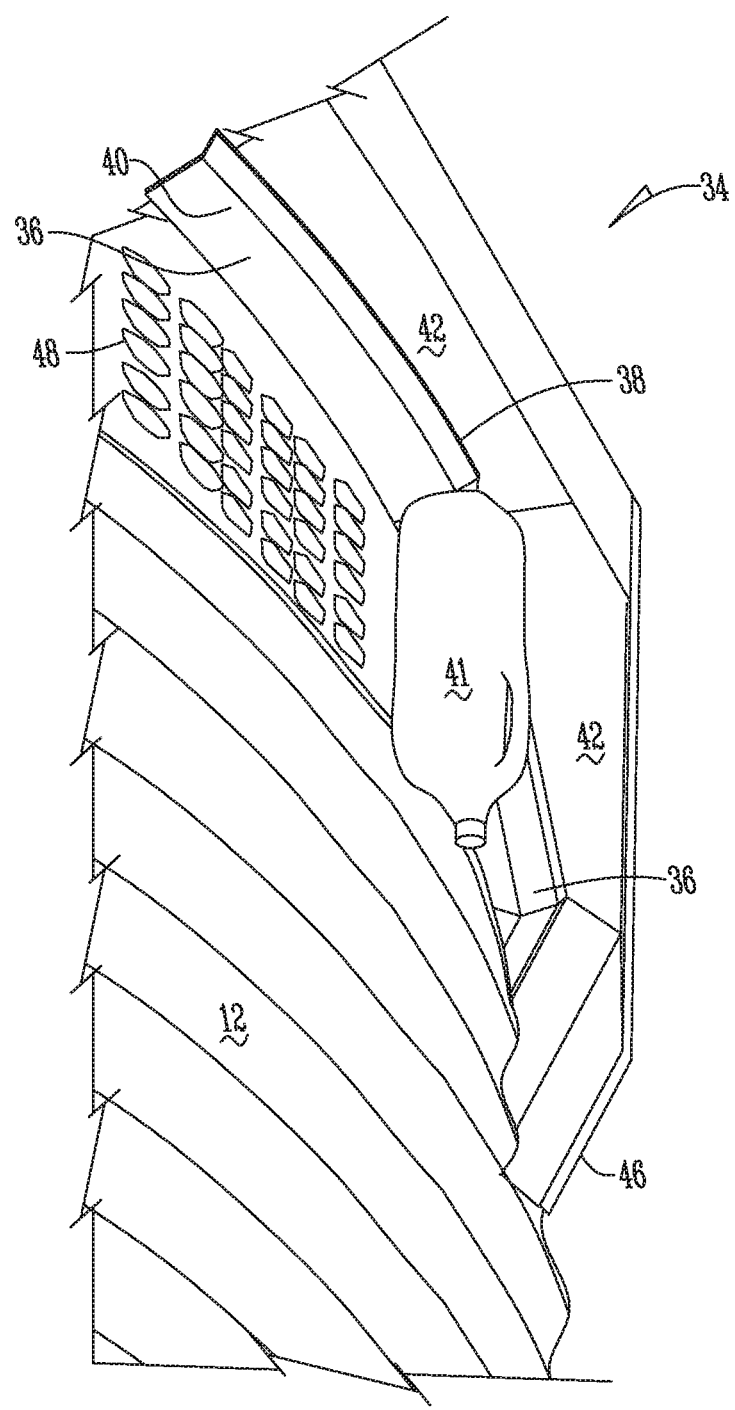
FIG. 3 is a partial cut-a-way bottom perspective view of the dwelling assembly.
Figure 4:
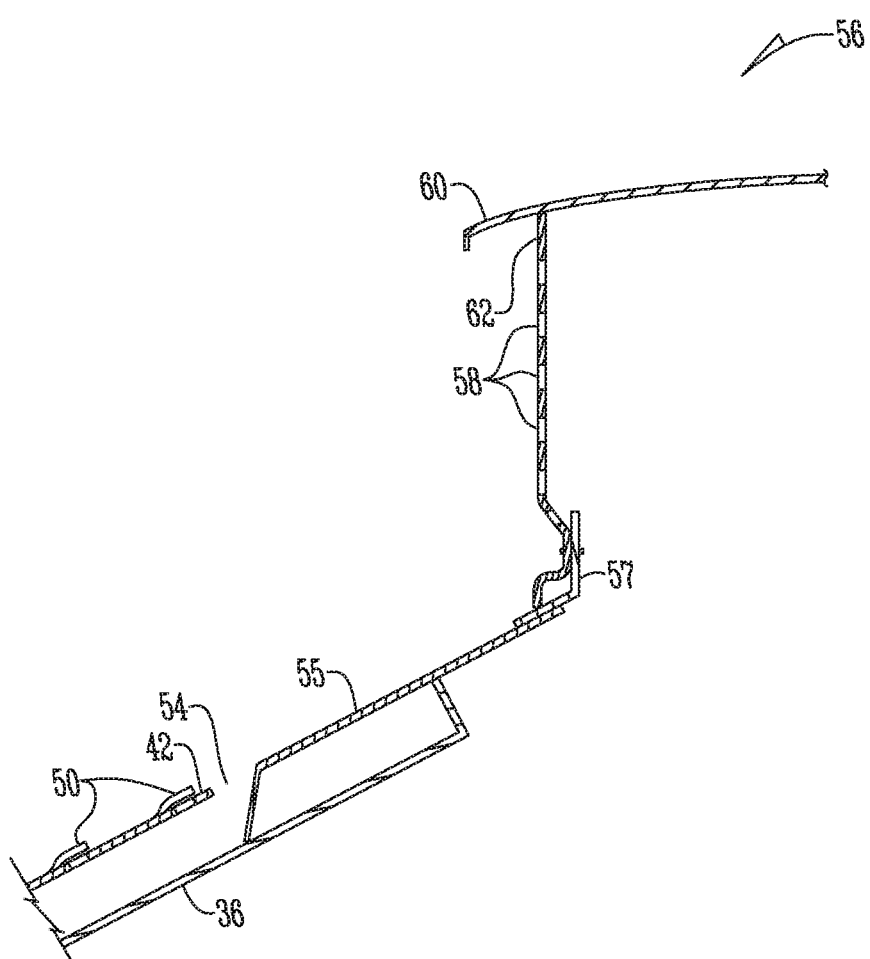
FIG. 4 is a partial side sectional view of a dwelling.
Figure 5:
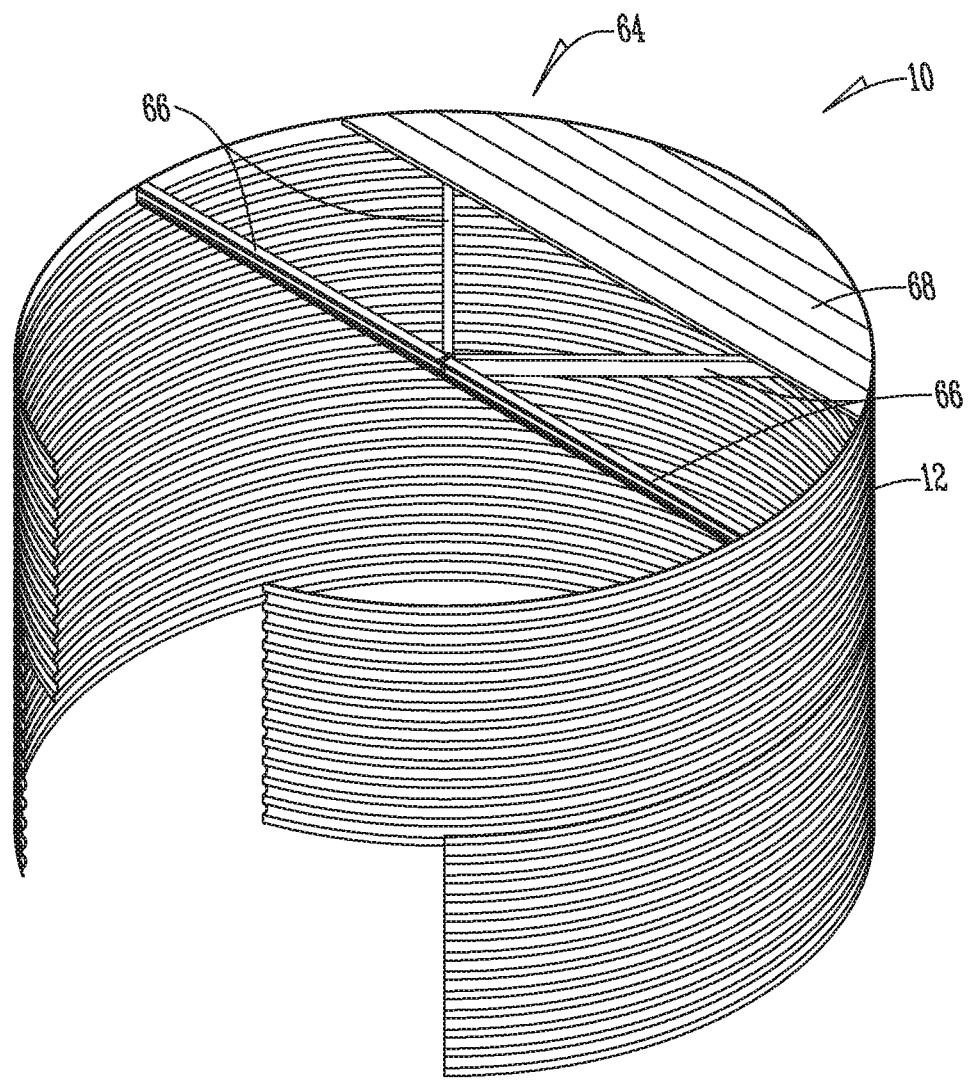
FIG. 5 is a partial perspective view of a dwelling with a loft.

As best shown in FIG. 3 a roof assembly 34 is also secured to the sidewall 12. The roof assembly comprises a first roof 36 that extends past the sidewall 12, to form an overhang over the top edge of sidewall 12, and at a first end 38 has an angled element 40 that angles upwardly away from the sidewall 12 to provide a lip such that when rain falls to the first roof it is captured and runs along the angled element 40 into a container 41 that is secured to the sidewall 12. Thus, when rain gathers on the roof it is directed toward the container 41 to provide additional drinking and usable water.

A second roof 42 is connected in spaced relation to the first roof 36 via rib elements 44 such that the roof assembly 34 has first and second spaced apart roofs 36 and 42. Similar to the first roof 36, the second roof 42 extends past the sidewall 12 and additionally past the first roof 36, to form an overhang over the top edge of sidewall 12. Second roof 42 also has a downwardly extending flange 46 that extends in parallel spaced relation adjacent the sidewall 12. Thus, the first roof 36 and second roof 42 provide additional shade to the sidewall 12 and protection such that vent openings 48 can be placed in the sidewall 12 with minimal rain and water being disposed through the openings to the interior 18 of the dwelling assembly 10. In addition, the second roof 42 has a plurality of perforations or openings 50 disposed therein to allow hot air to rise through the openings 50 and rain to fall through the openings 50 of the second roof 42 and onto the first roof 36 so that water may flow to the container 41.

The first roof 36 extends from first end 38 and terminates at apron 55. The second roof 42 extends from an outer edge 46 to opening 54. The apron 55 is connected to a peak ring 57 which is connected to a cupola 56 that is a generally arcuate structure that contains a plurality of perforated openings 58 therein to provide venting of hot air from the interior 18 of the dwelling assembly 10. Secured at the top of the cupola 56 is an eve 60 that extends away from a vented sidewall 62 of the cupola 56 in order to prevent rain from entering into the dwelling. The bottom of the cupola 56 is indented to prevent drain leakage into the dwelling. Solar panels, not shown, may be placed on the dwelling to provide a power supply for cell phones, computers, and the like.

In one embodiment disposed within the dwelling assembly 10 is at least one loft 64. The loft 64 is preferably comprised of a plurality of frame members 66 covered by a plurality of floor planks 68. The frame members 66 are connected to and extend from sidewall to a central joint 70. The loft 64 covers only a portion of the dwelling 10 interior.

In operation, the dwelling is erected by taking the sidewall 12 pieces and securing them to present an arcuate sidewall 12. Locking door 16 and windows 20 can then be secured into the openings of the sidewall and ballast boxes 22 can be secured to the sidewall 12 and filled with materials such as sand, rocks and/or soil to provide extra weight for the dwelling assembly 10. The roof assembly 34 is then constructed by constructing the first roof 36 that is secured to the sidewall 12 and attaching a second spaced apart second roof 42 to the first roof 36 via rib elements 44, both of which are secured to the cupola 56 at the central opening 54 to complete the structure. The dwelling, comprising many components, can easily be disassembled, transported without taking up much space, and reused at another location.

The second roof 42 acts as a heat shield reflecting the heat from the sun while the first roof 36 remains minimally effected by the heat of the sun. As a result of the openings or perforations 50 and the second roof 42, hot air is able to vent out from in between the first and second roofs 36 and 42 to keep the interior 18 of the dwelling assembly 10 cool. In addition, hot air is vented out of the cupola 56 to keep the interior 18 of the dwelling assembly 10 cool. In addition, as the wind blows the wind is vented into the interior 18 of the dwelling assembly 10 through the openings 58 of the cupola 56 and vent openings 48 to provide air circulation.

When rain occurs, the rain engages the eve 60 of the cupola 56 and drains to the apron 55 and subsequently to the first roof 36 through opening 54. To the extent rain enters openings 58 in sidewall 62 of cupola 56, the water drains to the bottom of the sidewall 62 where it is connected at the indented portion to the peak ring 57. Also, the rain will engage the second roof 42 and drain to the first roof 36 through openings 50. All rain directed onto the first roof 36 drains toward the angled elements 40 and into container 41. Thus, additional drinking and usable water is captured by the dwelling assembly 10.

Thus provided is a dwelling assembly 10 that is easily erected and provides improved structural integrity to previous transitional dwellings. In addition, the ballast boxes 22 function not only to add weight to the dwelling assembly 10 but additionally provides an area where plants may be grown within the boxes for food. A door 16 and a window 20 with locks are provided for additional security for individuals living in the dwelling assembly 10. Meanwhile, by utilizing a roof assembly 34 that contains first and second spaced apart roofs 36 and 42 in combination with multiple vent openings, a heat shield is provided minimizing the temperature in the interior 18 of the dwelling assembly 10 despite being constructed of corrugated metal in an environment of extreme heat. Finally, as a result of the eve 60 and overhanging first and second roof structures 36 and 42, minimal amounts of water, if any, enters the interior 18 of the dwelling assembly and maximum shade is provided for the sidewall 12. Besides reducing heat this also ensures that individuals' possessions within the dwelling have maximum protection from rain. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A dwelling assembly, comprising:
    a first sidewall having at least one opening for a door disposed there through;
    a roof assembly secured to the first sidewall and covering an interior formed by the sidewall; and
    a plurality of ballast boxes that surround and are secured to the exterior of the first sidewall, wherein each of the plurality of ballast boxes have a first wall and a second wall that extend outwardly from the first sidewall, a second sidewall that extends between the first wall and second wall opposite the first sidewall, and an open top that occupies the space between the first sidewall, first wall, second wall, and second sidewall.

2. The dwelling assembly of claim 1 wherein each of the plurality of ballast boxes has a hollow interior.

3. The dwelling assembly of claim 2 wherein the second sidewall is arcuate in shape.

4. The dwelling assembly of claim 1 further comprising connection members secured between the sidewall of the dwelling and first wall and second wall of the plurality of ballast boxes.

5. The dwelling assembly of claim 1 wherein the first sidewall has a generally arcuate shape.

6. The dwelling assembly of claim 1 wherein the first sidewall is continuous.

7. The dwelling assembly of claim 1 wherein the dwelling assembly is configured as a transitional dwelling, such that the dwelling assembly is capable of easy erection, disassembly, transport, and repeated reassembly.

8. The dwelling assembly of claim 1 further comprising materials positioned within the plurality of ballast boxes that add weight to the dwelling assembly such that the dwelling assembly is held to the ground surface and resists high winds.

9. The dwelling assembly of claim 1 further comprising each ballast box having a plate element that at least partially forms a bottom of each of the plurality of ballast boxes and engages a top surface of a ground surface.

10. A dwelling assembly, comprising:
    a sidewall having at least one opening for a door disposed there through;
    a roof assembly secured to the sidewall and covering an interior formed by the sidewall;
    a plurality of ballast boxes secured to the exterior of the sidewall;
    each of the plurality of ballast boxes having a plurality of connection members directly securing each plurality of ballast boxes to the exterior of the sidewall.

* * * * *